Inventors
ANDRÉ J. JUDEINSTEIN
JERZY M. TYSZKA
By [signature]
Attorney

Inventors
ANDRÉ J. JUDEINSTEIN
JERZY M. TYSZKA
By [signature]
Attorney

United States Patent Office 3,438,012

Patented Apr. 8, 1969

3,438,012

SEQUENTIAL DESTRUCTIVE READ-OUT AND RE-WRITE THIN-FILM MEMORY ARRANGEMENT

André Jacques Judeinstein, Antony, and Jerzy Marek Tyszka, Neuilly-sur-Seine, France, assignors to International Standard Electric Corporation, New York, N.Y., a corporation of Delaware Filed Nov. 3, 1964, Ser. No. 408,558
Claims priority, application France, Nov. 14, 1963, 953,663
Int. Cl. G11b 5/00
U.S. Cl. 340—174 4 Claims

ABSTRACT OF THE DISCLOSURE

A magnetic thin-film memory plane of the serial type with destructive read-out operation in which the word and sense conductors of each memory cell are parallel to the easy axis of the thin-film material and the digit conductor is parallel to the hard axis. The $n$ digit conductors are selected in succession by clock pulses and, during its time allotment, each digit conductor receives successively currents of equal amplitude and opposite polarity. The first current induces a read-out longitudinal field which reverses the magnetization of a corresponding cell and the second current induces a write longitudinal field which similarly reverses the magnetization of the cell. Each magnetization reversal induces a read-out signal in the sense conductor, with the first of said signals being presented to a sense amplifier, and used for rewriting if such is desired.

This invention relates to memories and more particularly to a magnetic thin film memory with destructive read-out operation utilizing the irreversible rotation of the magnetization vector due to the superimposition of two orthogonal magnetic fields of amplitude lower than both the anisotropy field and the wall coercive field of the material.

An object of this invention is to provide a magnetic thin film memory device in which the amplitude of the read-out signal induced in the sense conductors is higher than the output obtained from known devices.

Another object of this invention is to provide a magnetic thin film memory device in which practically no unwanted high amplitude parasitic signals are induced in the sense conductors when a write pulse is applied to the column conductors.

Yet another object of this invention is to provide a magnetic thin film memory device wherein the output of the line current generators can be appreciably reduced from that required in known devices.

A magnetic thin film is achieved in such a way as to present a uniaxial magnetic anisotropy which defines a preferred magnetization direction or easy axis along which the magnetization vector may take one of two stable positions of opposite direction and a difficult magnetization direction or hard axis which is perpendicular to the easy axis.

The following notations will be used in this specification wherein:

$H_K$ denotes a particular value of the magnetic field or anisotropy field which is one of the parameters characterizing the magnetic film considered;

$H_L$ denotes a longitudinal magnetic field applied parallel to the easy axis;

$H_T$ denotes a transverse magnetic field applied parallel to the hard axis; and B denotes the induction.

The characteristic curve $B=f$ ($H_L$) for $H_T=0$ presents the shape of a rectangular hysteresis curve having a coercive field $H_K$ similar to that obtained with a classical memory element such as a ferrite core.

The characteristic curve $B=f$ ($H_T$) for $H_L=0$ is reduced to a broken line constituted by two half lines parallel to the axis $H_T$ and of symmetrical ordinates linked by a line segment passing through the origin and it presents practically no hysteresis. When a longitudinal field and a transverse field are applied simultaneously, the area of the longitudinal hysteresis cycle decreases when the transverse field increases.

In a magnetic thin film, the magnetization reversal, i.e. the irreversible rotation of the magnetization vector, may take place according to two main ways:

(1) By domain-wall motion: in this mode, small parts of the material change their state successively as in a solid magnetic element such as a memory core. This process is intrinsically slow and is not used practically.

(2) By uniform rotation: in this mode, all the spins of the element are lined up and rotate simultaneously and the switching time is extremely short (a few nanoseconds).

A third mode also exists which is called non uniform rotation. In this mode, which is intermediate the two mentioned hereabove, the rotation would not start at the same moment in all the points of the element and the switching time would be higher than that occurring in uniform rotation.

In order to achieve a thin film memory, a plurality of unit memory cells, each one comprising one or two magnetic material spots, are deposited on a suitable base material.

In the memory having one magnetic spot per cell, the control fields are generally produced by currents which pass through two conductors parallel respectively to the easy and to the hard axis and which are located at the immediate proximity of the magnetic spot. A control conductor and its return wire behave like a loop located in a plane perpendicular to the plane of the magnetic film and when a control field is applied, the flux of the magnetization vector through this surface is proportional to the cosine of the angle made by this vector and the normal to the plane of the ring, the amplitude of the magnetization vector being assumed constant whichever may be its position.

If one considers a memory plane with one magnetic spot per cell and designed for storing $m$ $n$-digit words, this plane includes $mn$ memory points, $m$ line conductors parallel to the easy axis of the memory points, and $n$ column conductors parallel to the hard axis as well as $n$ read-out conductors. In the case where the reading is made in parallel form, the orientation of these conductors is chosen in accordance with the characteristics of the memory. Generally, the line current is applied before the column current, i.e. the transverse field builds up before the longitudinal field.

In a known type of parallel read-out memory, the sense conductors are located parallel to the hard axis. The read-out-write cycle concerning a word is achieved by applying first a current pulse to the selected line conductor of sufficient amplitude so that a transverse field where $H_T>H_K$ is produced. This field induces, in each memory point of the line, a rotation of approximately 90° of the magnetization vector, and the variation $\Delta\phi 0$ of the flux of this vector induces, in the associated sense conductor, a signal whose polarity depends upon the initial position of the magnetization vector. The column current pulses which are applied afterwards, produce a longitudinal field $H_L<H_C$, the polarity of which depends upon whether the digit which to be written is a 1 or 0. It will be noted that, during the read-out operation, the time $\Delta$ necessary for a 90° rotation of the magnetization vector depends mainly upon the amplitude and the rise time of the transverse field. The amplitude of the signal induced in the sense conductor, which is proportional to $\Delta\phi 0/\Delta$ to, is thus low. Besides, the write pulses applied to the column conductors induce high amplitude parasitic signals in the sense conductors which are parallel to said column conductors in known devices. This necessitates the use of complex sense amplifiers comprising compensation and strobing circuits as well as an anti-saturation circuit (this latter circuit prevents the blocking of the amplifier under the presence of a high amplitude parasitic signal).

The memory according to the invention, in which the sense conductors are located parallel to the easy axis, enables the carrying out of the destructive read-out either in series or parallel form, and the compliance with the objects of the invention as set forth herein.

In the series memory, a current pulse of long duration is first applied to the line conductor which crosses the memory points associated with the selected word. A read-write cycle is then effected successively on each one of these memory points. These two operations are controlled by sending successively over the column conductor associated with the point considered, a read pulse of a first polarity and a write pulse of opposite polarity.

The value $H_T$ of the transverse field induced by the line current is lower than that of the anisotropy field $H_K$ and the amplitude $H_L$ of the longitudinal field induced by a column current is lower, in absolute value, than the lowest of the values $H_C$ or $H_K$, the values of these fields $H_T$ and $H_L$ being such that the extremity of the field vector, resulting from their composition, is in the uniform rotation zone. It is seen that, in this mode of exploitation, the reading of a memory point which is in the 1 state induces an irreversible rotation of the magnetization vector which presents several advantages. Thus, the amplitude of the output signal is higher than in the above mentioned example since it depends mainly upon the switching time of the film, and, since the column conductors are perpendicular to the sense conductors, the column pulses induce practically no signal at all, by inductive coupling, in these conductors.

The transverse field $H_T$ is constant during the whole duration of selection of a word, so that it induces parasitic signals in the sense conductor only at the beginning or at the end of a word time, although this conductor is parallel to the line conductor. It results in a considerable simplification of the sense amplifiers.

Last, since the amplitude of the transverse field is much lower than in the first system, the memory according to the invention permits an appreciable reduction of the output of the line current generators.

Multiple plane memories with parallel access operating according to the same principle may also be achieved.

The above mentioned and other objects of this invention will become more apparent by reference to the following description taken in conjunction with the accompanying drawings in which.

Figure 3A:
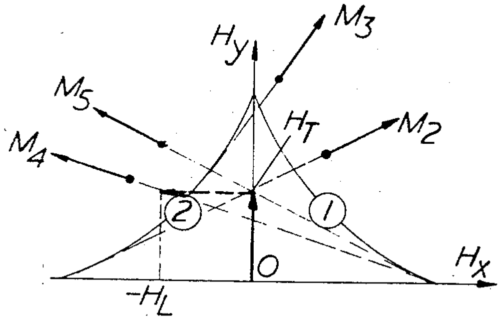
Figure 3B:
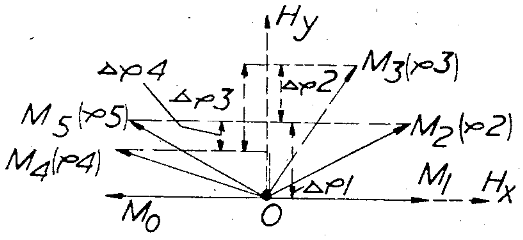
Figures 4, 5:
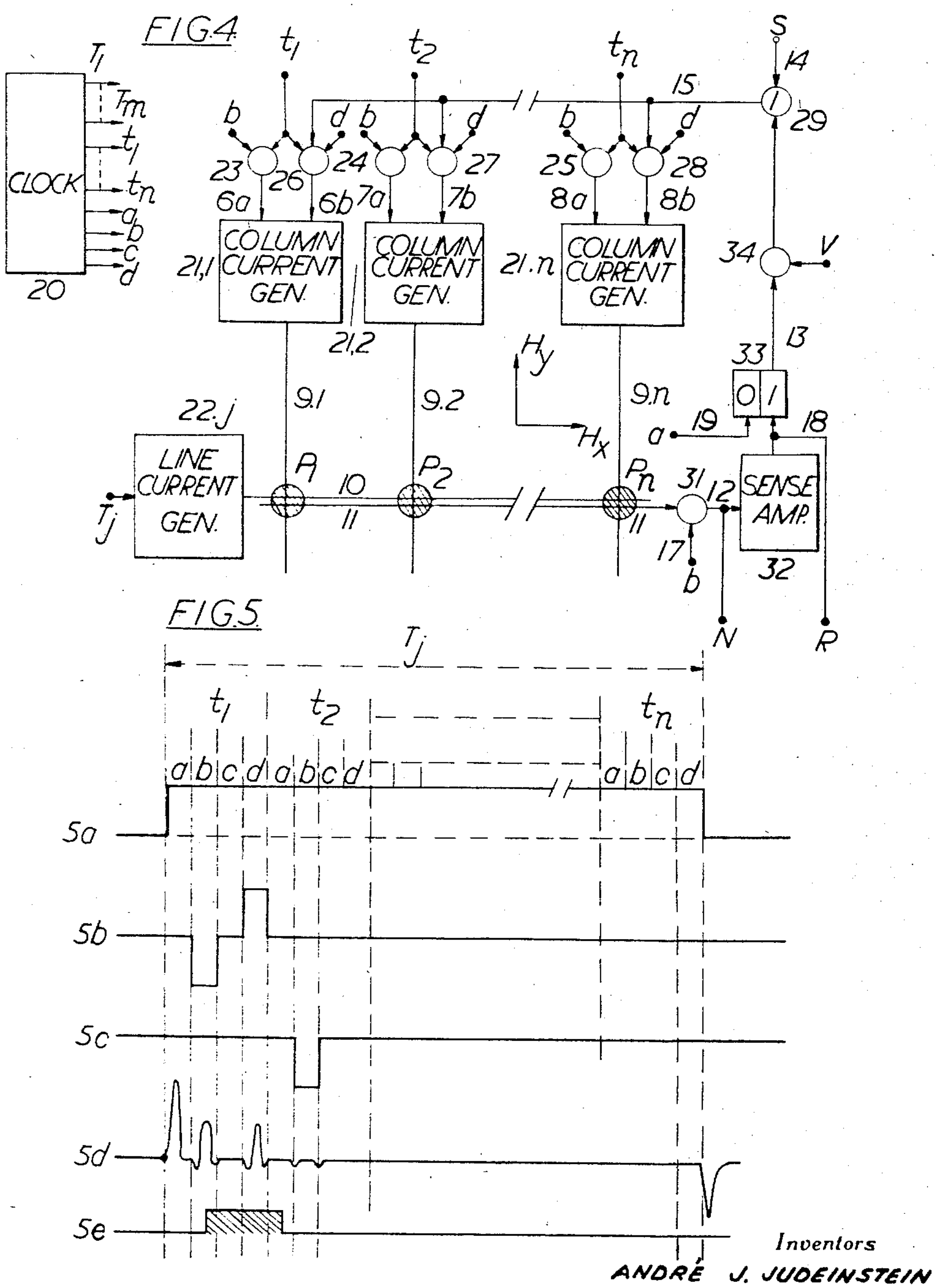

FIGURES 3*a* and 3*b* represent several values of the fields applied and the corresponding positions of the magnetization vector;

FIGURE 4 represents the simplified diagram of the organization of a memory according to the invention; and FIGURE 5 represents several signal diagrams.

Figure 1:
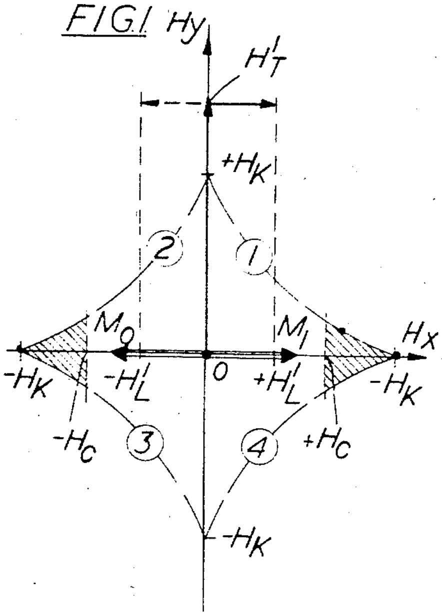
FIGURE 1 represents the critical rotational curve of a thin magnetic film.

FIGURE 1 represents a critical rotational curve on which have been drawn the vectors representing the fields applied in the known type of memory briefly described hereabove. This critical rotational curve is drawn on a coordinate axis system O$H_x$, O$H_y$ defining respectively the easy axis and the hard axis. It is constituted by an astroid the sides of which are referenced 1, 2, 3, 4 and the apices of which are on the coordinates $\pm H_K$. The hatched zones delimited inside the astroid by the lines of abcissae $\pm H_C$ with $|H_C|<|H_K|$ define approximately the regions of domain-wall motion wherein the field vector end must not lie if it is required to obtain quick switching.

It will be noted that magnetic films exist in which $|H_C|>|H_K|$ so that domain-wall motion cannot take place. In the following description, made in relation with FIGURES 1, 2 and 3, it will be assumed, by way of a non-limitative example, that a magnetic film is used in which $|H_C|<|H_K|$. When the end of the field vector is outside the astroid, the switching takes place by uniform or non-uniform rotation, this last switching mode occurring generally when the end of the vector is close to the astroid.

Lastly, the two stable positions of the magnetization vector in the absence of control fields have been represented by M0 and M1. The memory point is in the 0 state when this vector is in the position M0, and is in the 1 state when it is in the position M1.

It has been seen previously that, in the known memory, a line pulse was first applied thus creating a transverse field $H'_T>H_K$, such as shown in FIGURE 1. Whatever may be the state of the memory, the magnetization is submitted to a rotation of approximately 90°, which induces a sense voltage the polarity of which depends upon the initial state of the memory point. A longitudinal field of amplitude $H'_L<H_C$ is applied afterwards, this field being positive when a digit 1 is to be written, and negative when a digit 0 is to be written.

Figure 2:
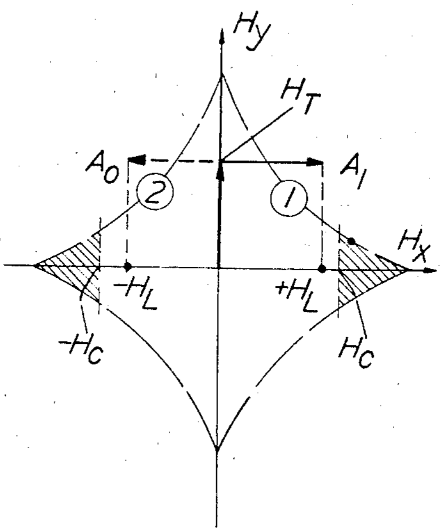
FIGURE 2 represents a critical rotational curve on which have been drawn the fields applied in the memory according to the invention.

FIGURE 2 represents the same critical rotational curve as that of FIGURE 1 on which have been drawn the vectors representing the fields applied in the type of memory according to the invention. It is seen that the value of the transverse field is $H_T<H_K$ and that the value of the longitudinal field is $|H_L|<H_C$, these amplitudes being such as the ends, A1 and A0, of the resulting field vectors are outside the astroid and in the zone of uniform rotation.

FIGURE 3*a* represents the parts 1 and 2 of the critical rotational curve corresponding to the positive transverse fields and the several directions M2 to M5 of the magnetization vector obtained by drawing the tangents to the curves from the various positions of the end of the resulting field vector. To each one of these directions is associated a particular value of the flux designated further by $\phi$1 to $\phi$5.

FIGURE 3*b* represents the directions of these magnetization vectors drawn from the origin 0 of the easy and hard axis.

In order to carry out this read-write operation according to the invention, the transverse field $H_T$ is first applied. The magnetization vector takes then one of the positions M2 or M5 which are symmetrical with respect to the hard axis, according to whether the memory point is in the 1 state or in the 0 state. If it is, for instance, in the 1 state, it is submitted to a rotation which brings it into the "position M2($\phi$2)," the corresponding flux in the loop constituted by the sense conductor parallel to $H_X$ being designated by $\phi$2.

In the course of the description, the flux of the magnetization vector will always be considered with respect to the loop constituted by the read conductor.

A longitudinal read field $-H_L$ is applied afterwards. During the time of setting up of this vector, the magnetization vector shifts first from the position M2($\phi$2) to the position M3($\phi$3) during the time $\Delta t$2 which depends upon the rise time of the current. Then, when the end of the resulting field vector crosses the part 2 of the astroid, it is submitted to a very fast irreversible rotation which shifts it to the position M4($\phi$4), the memory point then being in the 0 state. The variation $\Delta\phi$3 of the magnetization vector flux induces a signal in the sense conductor located parallel to the easy axis. When the longitudinal field is suppressed, the magnetization vector shifts to the position M5($\phi$5) but the memory point remains in the 0 state. Therefore it is seen that the read-out is destructive.

When the memory point is in the 0 state, i.e. when the magnetization vector is in the position M5($\phi$5) after the application of the field $H_T$, the application of the field $-H_L$ shifts it to the position M4($\phi$4). The variation $\Delta\phi 4$ of the magnetization vector flux is low and induces practically no signal at all in the sense conductor.

After a read-out, therefore, the memory point is always in the 0 state, and, if it is required to write a digit 1, a longitudinal field $+H_L$ is applied. The trajectory of the magnetization vector is exactly the same as during reading but the direction of displacement is opposite. A signal is thus induced in the sense conductor during this operation but it will be seen subsequently that this does not present any inconvenience at all.

FIGURE 4 represents the simplified diagram of the organization of a series memory according to the invention, but before undertaking its description, the meaning of certain symbols used in this drawing will be defined.

The symbols referenced 23, 24, 31 etc. represent coincidence gates or "AND circuits." The AND circuit 31 for instance, comprises two input terminals referenced respectively 11 and 17 and an output terminal 12 on which a signal appears when control signals are simultaneously applied on the two input terminals.

The symbol referenced 29 (a circle carrying inside the figure "1") is a mixing gate or "OR circuit" which delivers a signal on its output terminal 15 when a signal is applied on either one or the other of its two input terminals.

Last, the symbol referenced 33 represents a bistable circuit or "flip-flop" to which a control signal is applied on one of its input terminals 18 or 19 in order to set it respectively to the 1 state or to the 0 state. A voltage of the same polarity as the control voltage is present on the output terminal 13 when the flip-flop is in the 1 state.

The wiring diagram of FIGURE 4 will now be described.

As it has been defined in the foregoing, a memory designed for writing *m* words W1, W2 . . . W*j* . . . W*m*, each one comprising *n* digits D1, D2 . . . D*n*, wherein the reading and writing of the *n* digits of a given word is carried out in series form, will be considered.

The memory points related to the word W*j* have been shown in P1, P2 . . . P*n*.

The line conductors 10 and sense conductors 11 are common to all these memory points and are located parallel to the easy axis $H_X$. A column conductor is associated with each memory point and it is located parallel to the hard axis. The column conductors referenced 9.1, 9.2, **9.*n* are associated respectively with the memory points P1, P2**, P*n*.

The control current generators are referenced 21.1, 21.2, **21.*n* for the column current generators and 22.*j*** for the line current generator associated with the line *j*. Each column generator must deliver either a current of a first polarity or a current of opposite polarity according to whether the operation to be carried out is a read or a write operation. This way of operation has been shown symbolically by making provision for two input terminals for each one of the generators, these terminals being referenced **6*a*, 7*a*, 8*a* for those controlled during reading, and 6*b*, 7*b*, 8*b*** for those controlled during writing.

By analogy with the polarities of the longitudinal control fields such as they have been represented on FIGURE 2, it will be said that the polarity of the currents delivered by the column generators is negative for the reading and positive for the writing. The control signals of these generators are supplied by the AND circuits 23, 24, 25 for the reading and 26, 27, 28 for the writing.

The signals which appear on the sense conductor 11 of the word W*j* are applied to the sense amplifier 32, the AND circuit 31 being controlled during the time assigned for reading. This sense amplifier is common to all the memory lines which are therefore multiplexed on the input terminal N.

The output signal 18 of this amplifier, which constitutes the useful signal, appears on the terminal R, and is applied to the write flip-flop 33.

As it has been seen previously, the memory is of the destructive read-out type so that two things may happen after the read-out operation, namely, (1) the information read-out in the address *j* is re-written in the same address;

(2) the information read-out in the address *j* is not re-written and a new information is written in the same address *j*.

The selection between the above two modes of operation is made by applying a signal V to the AND circuit 34 only when the information must be re-written.

The output signal 13 of the flip-flop 33 passes through the AND circuit 34 and the OR circuit 29, the output conductor 15 of said circuit being multiplexed on the AND circuits 26, 27, 28. As has been mentioned previously, the AND circuit 34 receives the control signal V when the information must be re-written. In the alternate case, this AND circuit is blocked and the new information is applied to the terminal S connected to a second input terminal of the OR circuit 29. The writing and reading gates of the column generators, the input terminal 16 of the line generator **22.*j*, and the second input terminal of the AND circuit 31 receive enabling signals delivered by the clock 20**, in order to maintain the proper operating sequences.

We will now assume, by way of a non-limitative example, that the exploitation of the lines of the memory is carried out in a cyclic way i.e. the lines 1, 2 . . . *j* . . . *m* are selected in time succession by word time slot signals T1, T2 . . . T*j*, T*m* (FIGURE 5*a*) delivered by the clock 20, the information being re-written in the same address after reading when a signal V is present.

Each one of these time slots is divided into digit time slots by *n* digit time slot signals ***t*1, *t*2 . . . , *tn*** of equal duration assigned respectively to the execution of a read-write cycle for each one of the digits of a word. Each one of these digit time slots is itself divided into four basic time slots *a*, *b*, *c*, *d*.

FIGURE 5 represents the time intervals delimited by the digit time slot signals and by the basic time slot signals inside the word time T*j*. It will be noted that basic time slot signals of equal duration have been shown, but it will be seen further on that other distributions are possible. The signal T*j* applied to the input terminal 16, of the line generator **22.*j*** (FIGURE 4) is represented in FIGURE 5*a*. This signal controls the line current generator which delivers, over the conductor 10, a current which lasts during the time interval T*j* and which induces, in each one of the memory points P1 to P*n*, a transverse field $H_T$.

The digit time slot signals ***t*1, *t*2 . . . *tn* are applied respectively to the first input terminals of the AND circuits 23 to 28** and these gates are activated when either a basic time slot signal *b* (AND circuits 23, 24, 25) or a basic time slot signal *d* (AND circuits 26, 27, 28) appears in coincidence with an information signal on line 15. It is thus seen that, for each digit, the reading is carried out at the time *b* and the writing at the time *d*. Subsequently in this specification the basic time slot *a* of the digit time slot ***t*1 will be referred to as *t*1.*a***.

The operation of the memory represented on FIGURE 4 will be described now by studying the sequence of events in the read-write cycles over the memory points P1 and P2, assuming that initially they are respectively in the 1 state and in the 0 state.

When the clock 20 delivers a signal T*j* on line 16, the line *j* shown on FIGURE 4 is selected by the application of a transverse field $H_T$ (see FIGURE 2).

At is has been seen during the study of FIGURES 3*a* and 3*b*, this field induces, in each one of the points P1, to P*n*, a rotation of the magnetization vector in the position M2($\phi$2) or M5($\phi$5) according to the state of the memory point, these two positions being symmetrical with respect to the hard axis. Therefore, if $\Delta\phi 1$ designates the variation of the magnetization vector flux and $\Delta t1$ designates the rise time of the selection signal, each memory point causes a parasitic signal, the amplitude of which is proportional to $\Delta\phi 1/\Delta t1$, to be induced in the sense conductor 11. The parasitic signals of the different memory points are of the same polarity and they add up. A component due directly to the inductive coupling between the wires 10 and 11 which are parallel to each other is also added to this signal. The resulting parasitic signal is represented (FIGURE 5*d*) inside the time slot *a*. The rise time of the line pulse and the duration of the basic time slot *a* are selected in such a way as the parasitic signal disappears before the beginning of the time *t.1b* so that it cannot interfere with the signals sensed in the memory point P1. As a further protection, the AND circuit 31 is blocked during this time. Therefore, since the transverse field is sustained for the whole duration of the operations performed on a word, it is seen that no other parasitic signal will be induced by inductive coupling in the sense conductor 11. At the time *t1.b*, the AND circuit 23 delivers a control signal at the read input terminal 6*a* of the column generator 21.1. This latter delivers therefore a current which induces a negative longitudinal control field of amplitude $H_L$ shown in FIGURE 5*b*. As it has been seen during the study of FIGURES 3*a* and 3*b*, the magnetization vector of the point P1 (which is in the 1 state) is placed in the position M2($\phi 2$) before this current is applied. It shifts to the position M3($\phi 3$) in a time $\Delta t2$ during which the flux variation is $\Delta\phi 2$. A signal of amplitude proportional to $\Delta\phi 2/\Delta t2$ is thus induced in the sense conductor. The irreversible rotation takes place afterwards with a switching time $\Delta t3$ and the magnetization vector shifts to the position M4($\phi 4$). Since the flux variation $\Delta\phi 3$ is much higher than $\Delta\phi 2$ and generally $\Delta t3 \ll \Delta t2$, the amplitude of the signal induced in the sense conductor, proportional to $\Delta 3/\Delta t3$, is much larger, and of opposite polarity, than the signal proportional to $\Delta\phi 2/\Delta t2$.

It will be noted that the switching time of the film is independent of the characteristics of the control field so that the induced signal depends only upon the characteristics of the magntic film.

At the end of the time *t.1b*, the field $H_L$ is suppressed and the magnetization vector shifts to the position M5($\phi 5$) thus inducing a low-amplitude signal $\Delta\phi 4/\Delta t4$ of same polarity as the signal $\Delta\phi 2/\Delta t2$ in the sense conductor 11.

Since the AND circuit 31 (FIGURE 4) is activated at the time *b*, the sensed signals are applied to the input terminal 12 of the sense amplifier 22. This latter delivers an output signal 18 which controls the setting to the 1 state of the flip-flop 33 which is reset to the 0 state at each basic time slot *a*. A rectangular signal represented in FIGURE 5*e* thus appears on the conductor 13.

If a signal V is present, the AND circuit 34 is activated and the signal 13 is transmitted to the AND circuit 26. The latter is activated at the time *t1.d* and activates the column generator 21.1 which induces the application of a writing field $+H_L$. Since the hard axis Hy constitutes the symmetrical axis of the critical rotational curve, the vector M takes, during writing, positions which are homologous to those taken during reading, and is submitted to an irreversible rotation such that, if all the fields $H_T$ and $H_L$ were suppressed, it remains in position M1. For the same reason symmetry, a signal appears on the sense conductor in *t1.d* (see FIGURE 5*d*, time *d*) identical to that induced during reading. Since the flip-flop 33 is reset to 0 at each time *a*, the signal 13 is set up at least during the times *c* and *d* when a 1 has been read during a time *b*. It should again be noted that AND circuit 31 is only activated at the time *b* within any digit time slot *t1*, *t2* . . . *tn* and that any signals induced in the sense conductor 11 during the time *d*, or any other time, do not affect the operation of the circuit since they are blocked from the sense amplifier 32.

The time *t2* is reserved to the performance of the read-write cycle in the point P2, the magnetization vector of which is in the position M5($\phi 5$) at the time *t1.a*. In *t2.b*, the AND circuit 24 is activated, and its output signal controls the activation of the column generator 21.2, and a longitudinal field $-H_L$ is applied to the point P2 (see FIGURE 5*c*). The magnetization vector shifts then to the position M4($\phi 4$) and the flux variation of this vector is very low so that practically no signal at all is induced in the sense conductor 11. The flip-flop 33 remains in the 0 state and the re-writing circuit receives no signal at all.

It has been seen, during the description of FIGURE 4, that the memory requires only one sense amplifier 32 per word. It is also possible to connect the conductor 12 of each line or of a group of lines to a particular pre-amplifier and to multiplex the outputs of the different pre-amplifiers on the input terminal 12 of the sense amplifier 32.

The signal diagram of FIGURE 5 as well as the diagram of FIGURE 4 have been established by assuming that the clock 20 delivered *n* basic time slot signals of equal duration out of which the signals *a* and *c* are used to set up limit times between the read and write operations, the time *a* being also used, when the field $H_T$ builds up, in order to avoid the saturation of the sense amplifier by the parasitic signal. Several alternative solutions for the distribution of the time signals delivered by the clock may be designed.

For example, in a first alternative solution, the clock may supply, during a word time T*j*, $(n+1)$ digit time slot signals to, *t1*, *t2* . . . *tn*, the signal to being just used to avoid the saturation of the sense amplifier by the parasitic signals. In these conditions, the duration of the basic time slots *a* and *c* may be reduced and the basic time slot *c* may even be completely suppressed this enabling to obtain a substantial reduction of the cycle duration.

On the other hand, if it is required to achieve fast memories with cycle times ranging around a few tens of nanoseconds, it becomes necessary to take into account the time of propagation of the signals in the control and sense conductors. The read signals may thus appear, on the output terminal of amplifier 32 (FIGURE 4) with a time lag of one or several basic time slots with respect to the activation times of the AND circuits 23, 24, 25.

In a second alternative solution, this inconvenience may be obviated by adequately modifying the control time of the AND circuit 31 and of the flip-flop 33 and by carrying out the re-writing at the digit time slot following that of reading. In these conditions, the word time T*j* should include $(n+1)$ digit time slot signals *t1*, *t2* . . . *tn*, *t'o*, the signal *t'o* being used only for the re-writing in the memory point P*n*. Obviously, the two alternative solutions may be grouped together, by providing for $(n+2)$ digit time slot signals per word time.

By grouping in a suitable manner *p* memories according to FIGURE 2, a multiple-plane parallel memory is achieved. In this memory, the word selection consists in selecting simultaneously the same line and the same column of all the planes. In each plane, the *m* sense conductors are connected in series and linked to a sense amplifier. As in the case of a series operating memory plane, a certain number of pre-amplifiers may be used in each plane and their outputs may be multiplexed on the input terminal of the sense amplifier.

While the principles of the above invention have been described in connection with specific embodiments and particular modifications thereof it is to be clearly understood that this description is made by way of example and not as a limitation of the scope of the invention.

What is claimed is:

1. A magnetic thin-film memory comprising:

a magnetic thin-film material having a plurality of memory elements arranged in $m$ lines and $n$ columns, said columns being perpendicular to said lines and said lines being parallel to the easy axis of said thin-film material;

means for setting said memory elements in either of two stable states including a plurality of common line conductors parallel to the easy axis, and a plurality of common column conductors parallel to the hard axis;

sensing means including a plurality of common sense conductors parallel to the easy axis, a sense amplifier, and a sense gate coupling said sense amplifier to said common sense conductors;

clock means for generating discrete groups of sequential time slot signals including a first group of $m$ line signals, a second group of $n$ column signals generated for each of said $m$ line signals, and a third group of basic time slot signals generated for each of said $n$ column signals;

signal-generating means including first signal-generating means responsive to said first group of clock signals and coupled to said line conductors, and second signal-generating means responsive to said second and third groups of clock signals and coupled to said column conductors, whereby selection of a particular memory element is the result of the simultaneous generation of corresponding first and second group signals, and readout and sensing of the selected memory element result from a first basic time slot signal being coupled to said second signal generating means and said sense gate; and means for recirculating and rewriting into the selected memory element in response to a second basic time slot signal.

2. A memory according to claim 1 wherein:

said first signal-generating means comprises $m$ line-current generators coupled to said $m$ line conductors, each of said line-current generators delivering, when activated, a current which induces in each said memory element associated with said activated line-current generator a transverse field of amplitude lower than that of the anisotropy field of the thin-film material; and said second signal-generating means comprises $n$ column-current generators coupled to said $n$ column conductors, each of said column-current generators delivering a current of a first polarity during a read-out operation and a current of the opposite polarity during a writing operation, each said current inducing a longitudinal field in each memory element of lower amplitude than the coercive field and the anisotropy field of the thin-film material, the polarity of said longitudinal field depending upon the polarity of the column current generated.

3. A memory according to claim 1 wherein said reinserting means comprises a bistable element and a control AND gating means.

4. A memory according to claim 1 wherein said information-sensing and amplifying means comprises $m$ sense conductors situated substantially parallel to said line conductors, each of said sense conductors being coupled to a sense amplifier to have a read-out signal induced in said sense conductor and amplified in said sense amplifier each time there is a magnetization reversal in a memory element associated with the particular line being read.

References Cited

UNITED STATES PATENTS

| | | | |
|---|---|---|---|
| 3,054,988 | 9/1962 | Edwards et al. | 340—166 |
| 3,130,390 | 4/1964 | Moore et al. | 340—174 |
| 3,223,985 | 12/1965 | Bittmann et al. | 340—174 |
| 3,257,650 | 6/1966 | Koerner | 340—174 |

OTHER REFERENCES

Raffel, J. I. et al., "Magnetic Film Memory Design," Proc. IRE January 1951, pp. 155–163.

BERNARD KONICK, *Primary Examiner.*

J. F. BREIMAYER, *Assistant Examiner.*